No. 616,168. Patented Dec. 20, 1898.
H. E. WALTER.
NON-SLIPPING PNEUMATIC TIRE.
(Application filed Apr. 18, 1898.)
(No Model.)
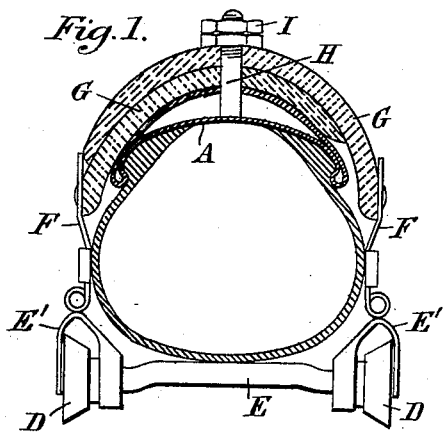
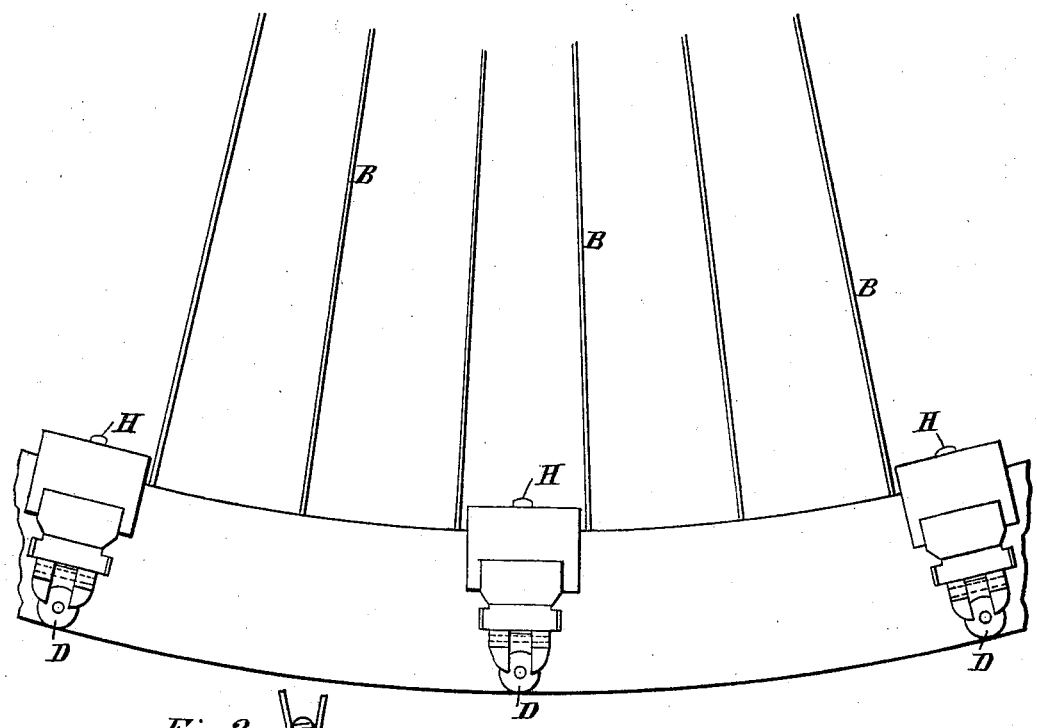
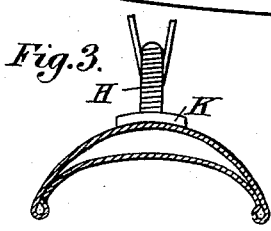
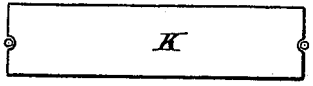

UNITED STATES PATENT OFFICE.

HENRY EDMOND WALTER, OF LONDON, ENGLAND.

NON-SLIPPING PNEUMATIC TIRE.

SPECIFICATION forming part of Letters Patent No. 616,168, dated December 20, 1898.

Application filed April 18, 1898. Serial No. 677,965. (No model.)

*To all whom it may concern:*

Be it known that I, HENRY EDMOND WALTER, electrical engineer, a subject of the Queen of Great Britain, residing at 53 Victoria street, London, England, have invented certain new and useful Improvements in Non-Slipping Pneumatic Tires, of which the following is a specification.

In order to prevent the wheels of bicycles and the like from slipping sidewise on slippery roads, I, according to this invention, mount around the circumference of a pneumatic tire and on either side of it a series of small disks or sharp-edged wheels. The disks or wheels may be mounted in pairs upon pins fixed across the outer circumference of a pneumatic tire, one at each end of the pin, so that they come one on either side of the tire, and as the wheel rolls over the ground they are in succession brought down onto and more or less cut into it and prevent sidewise slip. The pins may each be secured by leather straps, which can be passed crosswise around any portion of the tire and across the back of the metal rim of the wheel and be hooked over metal pins which extend radially inward from the back of the metal rim or be held in place in other suitable ways.

Figure 1 is a cross-section through a non-slipping pneumatic tire formed in the above manner. Fig. 2 is a side elevation of a portion of the tire, together with portions of some of the spokes. Figs. 3 and 4 show a modified way of carrying pins H.

A is the metal rim of the wheel, B the spokes, and C the hollow inflatable tire.

D D are the small sharp-edged disks mounted in pairs on the ends of pins E, which are held across the outer circumference of the inflatable tire at distances apart from one another. The pins E, near each of their ends, have metal plates E' secured to them. The upper part of the central part of each plate E' is pin-jointed to another metal plate F, and to each plate F is secured a short leather strap G. The upper part of the two outer portions of each plate E' are, as shown, bent downward, so as to come in front of the outer face of the disks D and form guards to keep any material from being caught in the wheels.

H H are pins extending from the back of the metal rim A. The leather straps G hook onto these pins, and the pins E are held in place across the outer circumference of the tire.

Any suitable catch may be employed for restraining the leather straps from springing off from the ends of the pins H. In the drawings I have shown a pair of lock-nuts I screwed onto the ends of the pins to attain this object.

In place of the pins H being fast with the metal rim A of the wheel they might, as shown, be carried by separate plates K, which fit onto the back of this rim and which are of a length to lie between two of the spokes.

What I claim is—

1. A pneumatic tire having around its circumference and on either side of it a series of sharp-edged disks or wheels at intervals apart one from another to more or less cut into the ground and prevent sidewise slip.

2. The combination of the metal rim A, the inflatable tire C, the pins E having sharp-edged disks or wheels D mounted on their ends, the straps G secured to the pins and passing around the tire and the pins H projecting from the back of the metal rim A for the straps to hook over substantially as described.

HENRY EDMOND WALTER.

Witnesses:
 ROBERT B. RANSFORD,
 WM. ROXBURY.